United States Patent [19]

Beyts

[11] Patent Number: 4,863,752
[45] Date of Patent: Sep. 5, 1989

[54] SWEETENER FOR COLA BEVERAGES

[75] Inventor: Pamela K. Beyts, Reading, England

[73] Assignee: Tate & Lyle PLC, England

[21] Appl. No.: 699,684

[22] Filed: Feb. 8, 1985

[30] Foreign Application Priority Data

Feb. 10, 1984 [GB] United Kingdom ............... 8403611

[51] Int. Cl.$^4$ ............................................. A23L 1/09
[52] U.S. Cl. ................................... 426/548; 426/590
[58] Field of Search ............... 426/548, 590, 594, 591, 426/597, 432, 435, 804

[56] References Cited

U.S. PATENT DOCUMENTS

| 3,642,491 | 2/1972 | Schlatter | 426/548 |
| 3,780,189 | 12/1973 | Scott | 426/548 |
| 4,435,440 | 5/1984 | Hough et al. | 426/590 |

FOREIGN PATENT DOCUMENTS

| 1352167 | 5/1974 | United Kingdom . |
| 1543167 | 3/1979 | United Kingdom . |
| 2092161A | 2/1982 | United Kingdom . |
| 2098848A | 12/1982 | United Kingdom . |
| 2103917A | 3/1983 | United Kingdom . |
| 2104063A | 3/1983 | United Kingdom . |

Primary Examiner—Donald E. Czaja
Assistant Examiner—Carolyn Paden
Attorney, Agent, or Firm—Ostrolenk Faber, Gerb & Soffen

[57] ABSTRACT

Low-calorie, carbonated acid-pH beverages such as cola can be sweetened with a combination of a chlorosucrose sweetener and a peptide sweetener in a ratio of respective sweetness contribution of from 40:60 to 72:28 to produce a product which closely resembles a sugar-sweetened beverage.

18 Claims, 1 Drawing Sheet

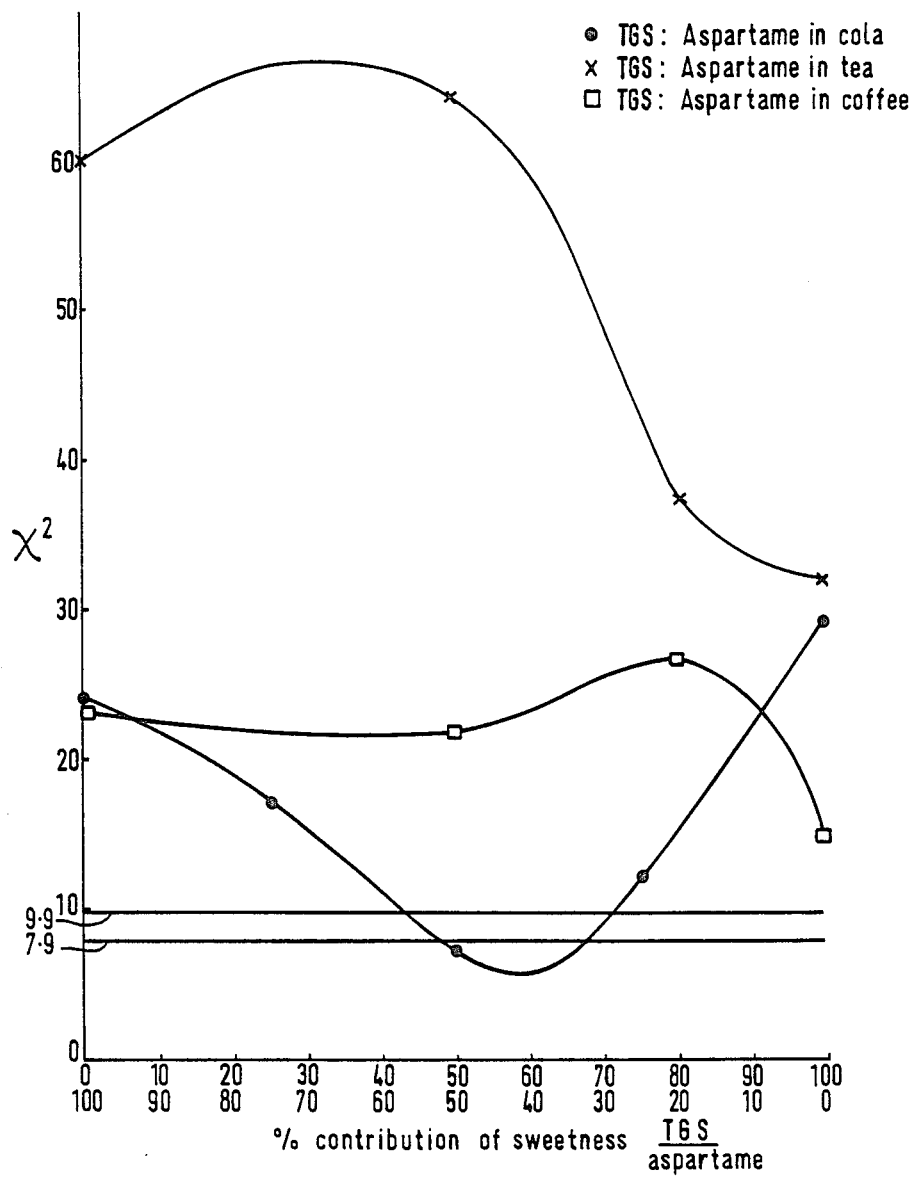

SWEETENER FOR COLA BEVERAGES

This invention relates to the sweetening of carbonated, acid pH soft drinks, especially those possessing a cola flavour, and in particular to calorie-reduced and a dietary drinks.

Soft drinks such as cola are generally sweetened with sucrose, although recently a proportion of sucrose has been replaced by high fructose corn syrups. It is a peculiar nature of the cola flavour that it is rather sensitive to the choice of sweetener, and only a minor proportion of the sucrose can, in fact, successfully be replace by other syrups. In the formulation of low-calorie and diet cola drinks, the problem is even more acute. Many formulations have been provided, especially in the dietary "one calorie" formula. Conventionally, one-calorie formulations are based on saccharin, which because of its unpleasant aftertaste is usually accompanied by various taste modifiers. It is also well known to modify saccharin by including in the composition another low-calorie sweetener, the combination of the two sweeteners providing a preferred sweetness. One well-known low calorie sweetener is L-aspartyl-L-phenylalanine methyl ester, known generically as aspartame, and supplied by G. D. Searle & Co. This is typical of a whole family of di- and tripeptide sweeteners. Other members include amino-protected aspartame (GB 2092161B); phenyl carbamyl L-aspartyl-L-phenylalanine derivatives (EP 107597A); other aspartyl dipeptides (US 3879372 and GB 1359123); amides of L-aspartyl-D-serine and L-aspartyl-D-cyclic amino acids (US 4399163, US 4465626 and US 4454328); other L-aspartyl-L-phenylalanine esters (WO 8301619A and EP .99960A) and tripeptides based on L-aspartic acid, L- and/or D-alanine and L- and/or D-valine (JP 036886 of 07.03.83).

It has previously been proposed to combine sweeteners of this type with saccharin, for example in GB 1352167.

Peptide sweeteners such as aspartame have been proposed as sweeteners for cola beverages, for example in GG 2103917A. However, there are some problems to overcome in such use, deriving from the acidity of the beverage. Because of their general lack of stability in acid environments, peptide sweeteners are not ideal for colas, even though they are now being used widely in diet colas because they have a considerably better taste than saccharin.

Another high potency sweetener proposed for use in cola beverages is 4,1',6'-trichloro-4,1',6'-trideoxygalactosucrose, known as TGS. This, and other chlorine-substituted sucrose sweeteners are disclosed in British Pat. No. 1,543,167 and in British Patent Appln. No. 2104063A. It has been found that combination of these chlorosucrose sweeteners with certain other sweetening agents having an accompanying bitter taste, leads to a marked synergy—that is to say an unexpected increase in the quantity of sweetness. Such synergistic compositions are disclosed in British Patent Appln. No. 2098848A. In these combinations, the sweetener having an accompanying bitter taste was generally saccharin, but other possibilities included acesulpham K (6-methyl-1,2,3-oxathiazin-4 (3K)-one,2,2-dioxide) and stevioside. In complete contrast, the combination of TGS with aspartame lead to a negative synergy: that is to say the sweetness was quantitatively reduced. There was thus no indication in the art that a combination of TGS with aspartame would be desirable, especially in cola As mentioned before, the cola flavour is particularly sensitive to the choise of sweetener and thus the qualitative nature of the sweetness obtained is of major importance, even if the best quality of sweetness is obtained with a sweetener which has a lower sweetening power than other sweeteners with lower sweetness quality. In estimating the quality of sweetness, it is axiomatic that the standard for comparison is pure sucrose. It is universally accepted that there is no sweetening agent which gives a better quality of sweetness.

There is thus a need for a sweetener for use in low calorie soft drinks, especially cola beverages, which is as close as possible to sucrosse in its sweetening quality. We have now found that certain combinations of a chlorosucrose sweetener such as TGS with a peptide sweetener such as aspartame provides a sweetener which is very like sucrose when applied to cola drinks. According to this invention, therefore, we provide a method of sweetening a low calorie, carbonated, acid pH soft drink such as a cola beverage by incorporating therein a combination of a chlorosucrose sweetener and a peptide sweetener in a ratio of respective sweetness contribution of from 40:60 to 72:28.

It is remarkable that the close resemblance to sucrose is a particular property of these chlorosucrose/peptide combinations in cola drinks. In other beverages the combination is less like sucrose than many other sweeteners. The particular quality of sweetness which so closely resembles sucrose is thus only remarked for the sweetener combination in cola.

The relative proportions of the two sweeteners in the sweetened cola may vary within the limits stated, but for preference the ratio for TGS:aspartame is from 42:58 to 72:28, especially from 47:53 to 68:32, ideally about 58:42. The proportions by weight of the two sweeteners will of course differ from these stated ratios, as their relative sweetness levels are different. Thus, TGS itself is approximately 531 times sweeter than sucrose in cola, while aspartame is only 200 times sweeter than sucrose (compared at a sucrose concentration of 8.5% by weight, the usual level in colas). Thus, a TGS:aspartame sweetness ratio of 40:60 to 72:28 corresponds to a weight ratio of about 1:4 to 1:1, and a ratio of 47:53 to 68:32 corresponds to a weight ratio of about 1:3 to 1:1.25. A sweetness ratio of 58:42 corresponds to a weightratio of about 1:1.9.

In order to confirm the finding that these particular combinations of sweeteners are alone in their close resemblance to sucrose in cola, various combinations of the sweeteners were incorporated into cola beverages at a sweetness level equivalent to about 8.5% sucrose. In blind taste panel tests, panellists were then asked to compare four samples each of which had been selected from cola sweetened with 8.5% sucrose or cola sweetened with one specified mixture of sweeteners to a sweetener equivalent to 8.5% sucrose. The panellists were asked to categorise them as: (1) definitely sucrose sweetened;
(2) probably sucrose sweetened;
(3) probably not sucrose sweetened;
(4) definitely not sucrose sweetened.

The results were analysed using the $\chi^2$(chi-squared) test, a test frequently used in dealing with results of this kind. The test compares the actual distribution that would be expected if the standard and the test substace were identical, i.e. in this case if they were both sucrose.

Under the conditions of the test, a $\chi^2$ value of less than 7.9 indicates that there is no significant difference (p>0.05) between the test substance and the standard, while a $\chi^2$ value of 9.9 or less indicates a significance of p>0.02.

Comparison of the results obtained in the tests shows that for the ranges of sweetener stated, the $\chi^2$ value is sufficiently low and thus the sweetener-containing samples are statistically indistinguishable from sucrose-containing samples. The results of tests carried out with panels of from 12 to 24 are summarised in FIG. 1, in the accompanying drawing. In contrast, the results of similar taste panel tests using tea and coffee are also plotted on the Figure: it will be immediately apparent that there is no useful enhancement of sweetness quality at all in these beverages.

The following Example illustrates the invention.

EXAMPLE 1

| Low Calorie Carbonated Cola Beverage | |
|---|---|
| | % w/v |
| Phosphoric acid (88%) | 0.0154 |
| Sodium benzoate | 0.0154 |
| Cola Extract (Naarden) | 0.48 |
| Cola Essence (Naarden) | 0.1 |
| Aspartame | 0.0179 |
| TGS | 0.0093 |
| Carbonated water | 100 |

The TGS and aspartame provide a sweetness contribution of approximately 58:42.

EXAMPLE 2

The sweetener combination in Example 1 was replaced by a combination of 0.0067% TGS and 0.0246% aspartame, i.e. providing a relative sweetness contribution of 42:58, or by a combination of 0.0115% TGS and 0.0119% aspartame, i.e. providing a relative sweetness contribution of 72:28.

EXAMPLE 3

Carbonated lemon-flavoured beverage

A beverage concentrate is prepared with the composition:

| Sodium benzoate | 160 mg |
|---|---|
| Citric acid | 1.7 g |
| Lemonade essence | 0.8 g |
| Aspartame | 179 mg |
| TGS | 93 mg |

Similar concentrates have the alternative sweeteners

| Aspartame | 246 mg |
|---|---|
| TGS | 67 mg |
| or Aspartame | 119 mg |
| TGS | 115 mg |

The concentrates are diluted to 1 liter with carbonated water.

I claim:

1. In a method of sweetening a low-calorie, carbonated, acid-pH soft drink by incorporating therein a sweetening amount of aspartame, the improvement which comprises improving the sweetness quality of said drink by employing a combination of a chlorosucrose sweetener and an aspartame sweetener in a ratio of respective sweetness contribution of from 40:60 to 72:28.

2. A method according to claim 1, in which the said sweetness contribution is from 42:58 to 72:28.

3. A method according to claim 1, in which the said sweetness contribution is from 47:53 to 68:32.

4. A method according to claim 3, in which the said sweetness contribution is about 58:42.

5. A method according to claim 1 in which the chlorosucrose sweetener is TGS and the respective weight ratio of the TGS to aspartame sweeteners is about 1:4 to 1:1.

6. A method according to claim 5, in which the ratio is about 1:3 to 1:1.25.

7. A method according to claim 6, in which the ratio is about 1:1.9.

8. A method according to claim 1 in which the drink is a cola.

9. A low-calorie, carbonated, acid-pH soft drink containing as sweetener a sweetning amount of a combination of a chlorosucrose sweetener and an aspartame sweetener in a ratio of respective sweetness contribution of from 40:60 to 72:28.

10. A drink according to claim 9, in which the said sweetness contribution is from 42:58 to 72:28.

11. A drink according to claim 9, in which the said sweetness contribution is from 47:53 to 68:32.

12. A drink according to claim 11, in which the said sweetness contribution is about 58:42.

13. A drink according to claim 9 in which the chlorosucrose sweetener is TGS and the respective weight ratio of the TGS to aspartame sweeteners is about 1:4 to 1:1.

14. A drink according to claim 13, in which the ratio is about 1:3 to 1:1.25.

15. A drink according to claim 14, in which the ratio is about 1:1.9.

16. A drink according to claim 9, comprising a cola.

17. A drink according to claim 13, comprising a cola.

18. A method according to claim 5 in which the drink is a cola.

* * * * *